United States Patent
Desrosiers

(10) Patent No.: US 10,337,139 B2
(45) Date of Patent: Jul. 2, 2019

(54) COMBINATION OF AN ORGANIC SUBSTRATE AND ORGANIC FORMULATION FOR USE AS A CUTTING BOARD AND STORAGE CONTAINER

(71) Applicant: ABEEGO DESIGNS INC., Victoria (CA)

(72) Inventor: Toni Marie Desrosiers, Victoria (CA)

(73) Assignee: ABEEGO DESGINS, INC. (CA)

( * ) Notice: Subject to any disclaimer, the term of this patent is extended or adjusted under 35 U.S.C. 154(b) by 111 days.

(21) Appl. No.: 15/437,380

(22) Filed: Feb. 20, 2017

(65) Prior Publication Data

US 2017/0241070 A1  Aug. 24, 2017

(51) Int. Cl.
| | |
|---|---|
| *D06M 13/144* | (2006.01) |
| *C09D 193/00* | (2006.01) |
| *B65D 25/14* | (2006.01) |
| *D06M 13/244* | (2006.01) |
| *A47J 47/00* | (2006.01) |
| *C09D 5/14* | (2006.01) |
| *D06M 13/224* | (2006.01) |
| *D06M 15/17* | (2006.01) |
| *D06M 11/74* | (2006.01) |
| *D06M 13/02* | (2006.01) |
| *D06M 16/00* | (2006.01) |
| *C08L 91/06* | (2006.01) |
| *C08K 3/34* | (2006.01) |
| *D06M 101/06* | (2006.01) |

(52) U.S. Cl.
CPC ......... *D06M 13/144* (2013.01); *A47J 47/005* (2013.01); *B65D 25/14* (2013.01); *C08L 91/06* (2013.01); *C09D 5/14* (2013.01); *C09D 193/00* (2013.01); *D06M 11/74* (2013.01); *D06M 13/02* (2013.01); *D06M 13/224* (2013.01); *D06M 13/2246* (2013.01); *D06M 15/17* (2013.01); *D06M 16/00* (2013.01); *C08K 3/346* (2013.01); *D06M 2101/06* (2013.01); *D06M 2200/01* (2013.01); *D06M 2200/12* (2013.01)

(58) Field of Classification Search
CPC ....... A47J 47/005; B65D 25/14; C08K 3/346; C09D 193/00; C09D 5/14; D06M 13/144; D06M 13/2246; D06M 15/17; D06M 2106/06
See application file for complete search history.

(56) References Cited

U.S. PATENT DOCUMENTS 2,085,816 A * 7/1937 Meigs ............... C08J 7/047
106/162.7
6,994,335 B2   2/2006 Porchia et al.
(Continued)

FOREIGN PATENT DOCUMENTS

CN    2912479    *  6/2007

*Primary Examiner* — Yan Lan
(74) *Attorney, Agent, or Firm* — Baumgartner Patent Law; Marc Baumgartner

(57) ABSTRACT

A combination is provided that is used as a self-healing cutting board or a storage container. Both comprise a natural fabric and a formulation. The formulation infuses the natural fabric. The formulation comprises a natural wax, which is preferably bees wax and Damar resin, and has a melting point of about 70 C to about 80 C. The cutting board can be rejuvenated by heating. Both the board and the storage containers are anti-microbial, non-skid, water resistant, reuseable and compostable.

8 Claims, 8 Drawing Sheets

(56) References Cited

U.S. PATENT DOCUMENTS

| | | |
|---|---|---|
| 7,758,029 B2 | 7/2010 | Lim et al. |
| 8,141,860 B2 | 3/2012 | Goldman |
| 8,870,173 B2 | 10/2014 | Lundberg |
| 8,985,567 B2 | 3/2015 | Constantino et al. |
| 2005/0239355 A1 | 10/2005 | Bennett |
| 2010/0233146 A1* | 9/2010 | McDaniel .............. A01N 63/02 424/94.2 |

* cited by examiner

COMBINATION OF AN ORGANIC SUBSTRATE AND ORGANIC FORMULATION FOR USE AS A CUTTING BOARD AND STORAGE CONTAINER

CROSS REFERENCE TO RELATED APPLICATIONS

This application claims benefit of Canadian Patent Application Serial No. 2921706, filed on Feb. 19, 2016, entitled COMBINATION OF AN ORGANIC SUBSTRATE AND ORGANIC FORMULATION FOR USE AS A CUTTING BOARD AND STORAGE CONTAINER, the contents of which are incorporated herein by reference.

FIELD OF THE INVENTION

The present technology is directed to cutting boards, and storage containers that are made from natural products. The storage containers and cutting boards are anti-microbial, mouldable, breathable, reusable, recyclable, washable, and compostable. The cutting boards are substantially self-healing. More specifically the technology is directed to products that can be used on or with foods and that do not include plastic polymers, petrochemical-based polymers or petrochemical-based waxes. They can be provided as boards, or storage containers.

BACKGROUND OF THE INVENTION

Cutting boards are made from a range of materials, including wood or stone. For example, U.S. Pat. No. 8,870,173 discloses a cutting board which is constructed simply of a relatively thick (11/2") piece of soft wood such as Douglas fir and reinforced with wooden dowels perpendicular to the grain of the wood. Such unique construction maintains the flatness of the board allowing it to be maintenance free and washable in a normal dishwasher cycle without warping. Wood sufficiently porous to allow for liquid or other matter to seep into its pores and crevices. Over time and repeated usage, this can lead to contamination. The wood is sufficiently soft to be cut by the knife, resulting in further sites for contamination. Further to this, the cuts are unsightly. The board also has to be thick in order for it to not warp. This means it cannot be bent or folded. Bending and folding allow a user to easily transfer the cut food from the board.

Stone boards are generally non-porous and are not subject to knife cuts. The hardness however, leads to damage and rapid dulling of knives.

As cleanliness is a common problem, U.S. Pat. No. 8,985,567 discloses a cutting board that allows a user to prepare food on one side of the cutting board while the other is being cleaned. The device provides a user a quick and easy transition to a new, clean, cutting board work surface without the need to carry waste to a disposal bin, without having to stop to wash and dry the soiled surface of the cutting board. This is a complex system for providing clean cutting surface. It does not address the removal of cuts in the board, which can harbour bacteria and can retain food, nor can the board be folded or bent.

Another approach is to dispose of the cutting board after use. U.S. Pat. No. 8,141,860 discloses foldable and disposable cutting board for preparing food is made of a thin, resiliently flexible sheet of propylene, stainless steel or other cut-resistant material. The board has a triangular section projecting away from the user to form a distal pouring funnel and spout when the board is folded along its middle by grabbing both sides and moving them toward each other. A narrow fence extending upwardly from the periphery of the board converges at the apex of the triangular section. A rigidizing flange extends outwardly from the upper rim of the fence but is interrupted near the apex. The fence is interrupted along an offset portion of the edge in order to provide clearance for the blade and handle of a chopping or mincing instrument. This is a relatively complex cutting board. Disposable cutting boards are wasteful and are a very poor approach to providing a clean surface. Most users would tend to reuse the board. Reuse would result in all the deficiencies of a conventional cutting board.

U.S. Pat. No. 6,994,335 also discloses a disposable and absorbent cutting board. It is constructed from a layer of corrugations and an absorbent layer. The corrugations may be relatively small and tightly spaced to provide the board with strength and rigidity. The absorbent layer may be made of non-woven cellulosic fibers and include one or more score lines to facilitate folding. A backing layer may also be provided, on the layer of corrugations opposite to the absorbent layer, to provide non-skid oliophilic or hydrophilic properties. The board is provided with score lines to allow for it to be folded. Again, disposable cutting boards are an unacceptable approach to providing a clean cutting surface.

In a related approach, U.S. Pat. No. 7,758,029 discloses a cutting board with a plurality of cutting sheets. The sheets are disposed of once used.

More recently, cutting boards have been made of hard plastics. Such plastic materials do provide a less porous and more easily sterilizable surface, however, they have been found to be inferior to wood with regard to anti-bacterial properties. Further, they are less cut resistance and thus can more quickly become marred or otherwise defaced.

Storage containers tend to be made of plastic polymers or glass. Both are reusable. There is concern about storing food in the plastic polymer storage containers, as releasing agents and other components have been shown to leach into the food. Further, microwaving food in these containers is not recommended. Glass containers are superior to the plastic polymer containers as they do not leach and there is little concern over microwaving food in them. They are, however, prone to breaking, heavy and more expensive. Neither of these mask odours, nor do they allow for limited gas exchange, while inhibiting or reducing moisture exchange.

United States Patent Application 20050239355 discloses a formable play material is constructed from pouring a melted plasticine clay material over a nylon mesh sheet creating a nylon reinforced sheet of pliable clay. The formable play material has improved moldability due to the reinforcement and is easily reshaped and welded together by pinching and pressure. The formulation is Microcrystalline Wax 10 Pounds; #10 Weight Oil ½ Gallon; Automotive Grease 4 Pounds; and Dry Clay Powder 25 Pounds. Beeswax may be used for part of the wax component. Petroleum jelly may be used for the grease. Purified mineral oil may be substituted for the 10 weight motor oil. Using these alternatives, the moldable material smells better and does not have a problem with the rubber mold compounds. Varying the proportions of the constituents slightly will yield harder or softer clays. The provided sheet is intended to stay soft and pliable so it may be reshaped or welded together through pinching and pressure, or layered over existing mold forms. If the Sheet begins to lose pliability or to firm up, it may be resoftened with the application of heat. This product would not be safe for use with food, nutraceuticals, herbs, or the like.

What is needed is a cutting board that is soft enough to reduce dulling of knives, while not being permanently damaged by the knife cuts. It would be a further advantage if the board could be rejuvenated. It preferably would have anti-bacterial properties, be bendable and foldable, and could be rolled into a tube, but rigid enough to maintain its planar shape. It would be preferably if it was light weight. It would also be preferable if it was non-skid. It would be of further advantage if it was hydrophobic. It would be preferable if the cutting board had the features of: washable; compostable; self-healing; flexible; soft enough to minimize knife damage; stain resistant; anti-microbial; and water resistant. It would be further preferable if the same combination could be used to form storage containers. In this case, it would be preferable if it was rigid enough to maintain its shape. It would be preferable if the storage containers had the features of: washable; remouldable; so as to be reusable; compostable; breathable; flexible; stain resistant; anti-microbial; and water resistant.

SUMMARY

The present technology provides cutting boards and storage containers that are composed of natural products. A formulation is used to layer onto and/or impregnate a substrate which is a fabric. The cutting board is soft enough to reduce dulling of knives, while not being permanently damaged by the knife cuts. It can be rejuvenated. It has anti-bacterial properties, is bendable and foldable, and can be rolled into a tube, but rigid enough to maintain its planar shape. It is light weight and non-skid. The cutting boards have all the features of: washable; compostable; self-healing; flexible; soft enough to minimize knife damage; stain resistant; anti-microbial; and water resistant. The same combination can be used to form storage containers. They are rigid enough to maintain their shape. The storage containers have all the features of: washable; remouldable, so as to be reusable; compostable; breathable; flexible; stain resistant; anti-microbial; and water resistant.

In one embodiment, a self-healing cutting board is provided, the cutting board comprising a natural fabric and a formulation, the formulation infusing the natural fabric to provide an upper cutting surface and a lower cutting surface, the formulation comprising a natural wax and tree resin, and having a melting point of about 70 C to about 80 C.

In the self-healing cutting board, the formulation may be an anti-microbial formulation.

In the self-healing cutting board, the natural wax may be beeswax.

In the self-healing cutting board, the formulation may further comprise kaolin.

In the self-healing cutting board, the fabric may have a plurality of interstitial spaces and the interstitial spaces may be substantially filled with the formulation.

In the self-healing cutting board, the formulation may comprise about 30% to about 50% tree resin and about 50% to about 70% bees wax.

In the self-healing cutting board, the formulation may be composed of about 30% to about 40% Damar resin, about 30% to about 40% bees wax and about 20% to about 40% kaolin.

In the self-healing cutting board, the natural fabric may be a knit or weave of a fibre selected from the group consisting of bamboo linen, silk, cotton, jute, kenaf, hemp, linen, sisal, herbaceous dicot fibres and monocot fibres and mixtures thereof.

In the self-healing cutting board, the fabric may be canvas.

In another embodiment, a method of rejuvenating a cutting board is provided, the method comprising placing the self-healing cutting board of claim 9 on a flat surface and heating the cutting board to between about 60 C to about 80 C.

In another embodiment, a combination of a natural fabric and a formulation is provided, the combination comprising a first surface, an inner layer, and a second surface, the inner layer substantially comprising the natural fabric infused with the formulation, the first surface and the second surface substantially comprising the natural fabric infused with the formulation, wherein the formulation is composed of a natural wax, and tree resin.

In the combination, the natural wax may be beeswax.

In the combination, the fabric may have a plurality of interstitial spaces and the interstitial spaces may be substantially filled with the formulation.

In the combination, the formulation may further comprise kaolin.

In the combination, the formulation may comprise about 30% to about 50% Damar resin and about 50% to about 70% bees wax.

In the combination, the formulation may be composed of about 30% to about 40% Damar resin, about 30% to about 40% bees wax and about 20% to about 40% kaolin.

In the combination, the natural fabric may be a knit or weave of a fibre selected from the group consisting of bamboo linen, silk, cotton, jute, kenaf, hemp, linen, sisal, herbaceous dicot fibres and monocot fibres and mixtures thereof.

In the combination, the fabric may be canvas.

In the combination, the combination may be a cutting board.

In the combination, the combination may be a storage container.

SUMMARY OF THE INVENTION

Figure 1:
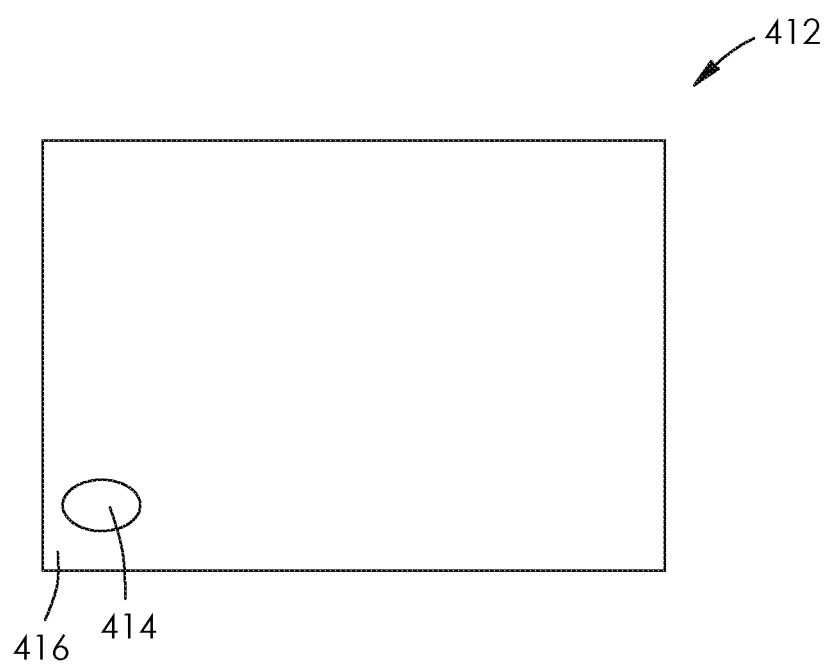
FIG. 1 shows a view of a cutting board of the present technology.

Except as otherwise expressly provided, the following rules of interpretation apply to this specification (written description, claims and drawings): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, The terms "comprising," "having," "including," and "containing" are to be construed as open ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Beeswax—The main components are palmitate, palmitoleate, and oleate esters of long-chain (30-32 carbons) aliphatic alcohols, with the ratio of triacontanyl palmitate $CH_3(CH_2)_{29}O$—CO—$(CH_2)_{14}CH_3$ to cerotic acid $CH_3(CH_2)_{24}COOH$, the two principal components, being 6:1. Beeswax can be classified generally into European and Oriental types. The saponification value is lower (3-5) for European beeswax, and higher (8-9) for Oriental types.

Beeswax has a relatively low melting point range of 62 to 64° C. (144 to 147° F.). If beeswax is heated above 85° C. (185° F.) discoloration occurs. The flash point of beeswax is about 204.4° C. (400 to 470° F.). Density at 15° C. is 958 to 970 $kg/m^3$.

Natural beeswax—When cold it is brittle; at ordinary temperatures it is tenacious; its fracture is dry and granular. The sp. gr. at 15° C. is from 0.958 to 0.975, that of melted wax at 98°-99° compared with water at 15.5° is 0.822. It softens when held in the hand, and melts at 62°-66°; it solidifies at 60.5°-63° C.

Fabric—in the context of the present technology, a fabric includes knits and weaves of fibres such as, but not limited to nylon, rayon, Kevlar®, silk, cotton, hemp, linen, sisal, hardwood fibre, softwood fibre and mixtures thereof.

Natural fabric—in the context of the present technology, natural fabric includes knits and weaves of silk and of plant derived fibres, such as, but not limited to cotton, jute, kenaf, hemp, linen, sisal, hardwood fibre, mechanically processed bamboo (bamboo linen), softwood fibre, herbaceous dicot fibres and monocot fibres and mixtures thereof. Natural fabric does not include fabrics from regenerated fibres.

Tree resin—The preferred resin is from the Damar tree and is referred to also as Damar gum. Without being bound to theory, the tree resin increases the melting point of the wax and adds to the adhesive qualities when mixed with the oil. The damar crystals melt at about 225° C. The resin is obtained from the Dipterocarpaceae family, principally those of the genera *Shorea, Balanocarpus* or *Hopea*. Other resins or exudates from plants and trees that provide the desired traits can be used wholly or in part as substitutes, for example, resin from the copal tree, *Protium copal* (Burseraceae) or the mastic tree, *Pistacia lentiscus* or sandarac from the *Tetraclinis articulata* tree may substitute for the Damar tree. Accordingly the term "tree resin" refers to any of the above mentioned resins or combinations thereof. Up to about 5% *candelilla* or *carnauba* wax may be included in any of the resins or mixtures thereof.

Kaolin—Kaolin is a clay made from a hydrous aluminum silicate. It is used in the paper industry as a paper coating which improves appearance by contributing to brightness, smoothness and gloss. It also improves printability. Additionally, it is used by the paper industry as a filler. In the present technology, kaolin is used to impart stain resistance to the products, absorption of oils into the paper and fabric leading to rancidity of the products, reduce flammability, improve moldability and increase the melting point of the products. Bentonite was found to be inferior to kaolin in the present technology.

Perishables—Perishables, in the context of the present technology is any matter that will spoil over time if not protected. Perishables include, but are not limited to bread, baked goods, crackers, nuts, vegetables, cheese, meat, fruit and other foods, herbs, coffee, tea, plants, including, but not limited to flowers, leaves, roots, intact plants, pharmaceuticals, herbal remedies and nutraceuticals.

DESCRIPTION OF THE INVENTION

The general formula for the present technology includes bees wax and Damar resin (tree resin). A mixture of these components is heated and the substrate is infused and/or impregnated and coated with the mixture. Without being bound to theory, the formulation solves the following problems: Staining by oils in food; absorption of oils from food into the fabric leading to rancidity; poor odour masking; flammability; inferior moldability; inferior melting point; growth of microbes; lack of self-healing; residues left on materials being stored; and low resistance to oxidation. The formulation is applied to the fabric using either wet waxing or dry waxing techniques.

A cutting board, generally referred to as 412 is shown in FIG. 1. The cutting board can be cut in any shape, including, but not limited to rectangles, a circle, and an ellipse. The cutting board 412 has a hole 414 in the vicinity of a corner 416 to allow it to hang.

Figure 2A:
FIG. 2A shows the cutting board being bent.

As shown in FIG. 2A, the cutting board 412 is bendable. This assists in transferring food from the board 412. It can also be rolled up for storage or packaging. However, it is rigid enough to remain flat when lifted.

Figure 2B:
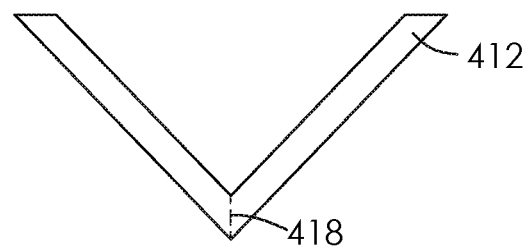
FIG. 2B shows the cutting board being folded.

As shown in FIG. 2B, the cutting board 412 can be folded. Score lines 418 may be provided to assist in folding.

Figure 3:
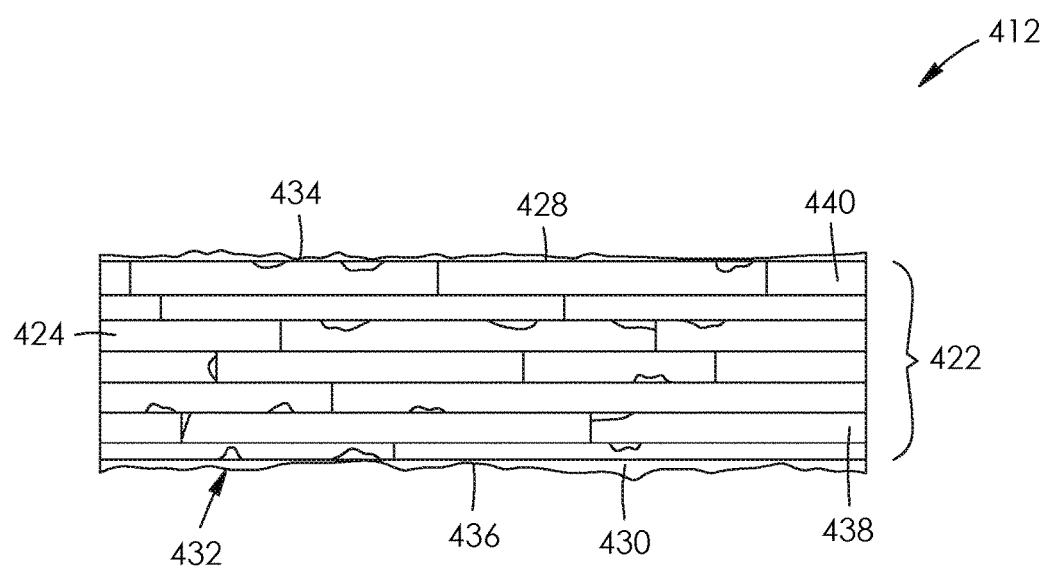
FIG. 3 is a cross sectional view of the cutting board of FIG. 1.

As shown in FIG. 3, the cutting board 412 has an inner layer 422 that is a natural fabric 424 and the formulation, generally referred to as 432, a first layer 428, a second layer 430, a first surface or upper surface 434, and a second surface or lower surface 436. The natural fabric 424 provides structural support for the formulation 432. The formulation 432 may sandwich, coat, impregnate, infiltrate, partially coat, cover, partially cover, or infuse the fibres 440 of the fabric 424. It substantially fills the interstitial spaces 438. The formulation 432 in the first layer 428 and the second layer 430 is continuous with the formulation in the interstitial spaces 438. The first layer 428 and the second layer 430 form the upper surface 434 and lower surface 436 and are the fabric infused with the formulation 432.

The fabric material has a thread count of about 10 nm/3 to about 10 nm/2. The preferred fabrics are made with natural fibres, such as knits and weaves of cotton, hemp, linen, sisal, silk and mixtures thereof. The preferred fabric weight is about 14 ounces to about 16.5 ounces to about 25 ounces and is canvas. The resulting cutting board is about 1 mm to about 4 mm thick.

In one embodiment, the formulation is about 30% to about 50% tree resin, and about 50% to about 70% bees wax, preferably about 30% tree resin, and about 70% bees wax. The formulation optionally includes charcoal as a colourant and odour inhibitor. It is preferred that the tree resin is Damar resin.

In another embodiment, the formulation is about 30% to about 40% tree resin, about 30% to about 40% bees wax and about 20% to about 40% kaolin. The formulation optionally includes charcoal as a colourant and odour inhibitor. It is preferred that the tree resin is Damar resin.

In use, the cutting board is used for cutting food. The board is soft enough to reduce damage and dulling of the knife. Thus, cutting with the knife leads to cuts in the surface. At any time, the user can rejuvenate the board by placing it on a flat surface and heating it to about 60 to about 80 C and all temperatures therebetween, preferably about 70 to about 80 C. Heating is preferably in an oven, to ensure even heating. The self-healing may take about three to about five minutes. The formulation melts and fills the interstitial spaces, scratches, other surface deformations and cuts. The user views the board and removes it from the heat when the cuts, scratches and any other surface deformation have been removed. The board is then cooled and is ready to use again. Healing of the surface deformities substantially removes sites for retaining contaminants, bacteria and the like. Further, the materials used in constructing the board impart anti-bacterial properties to the board. Heating the mat also restores it and flattens it if it has become bent or warped.

Figure 4:
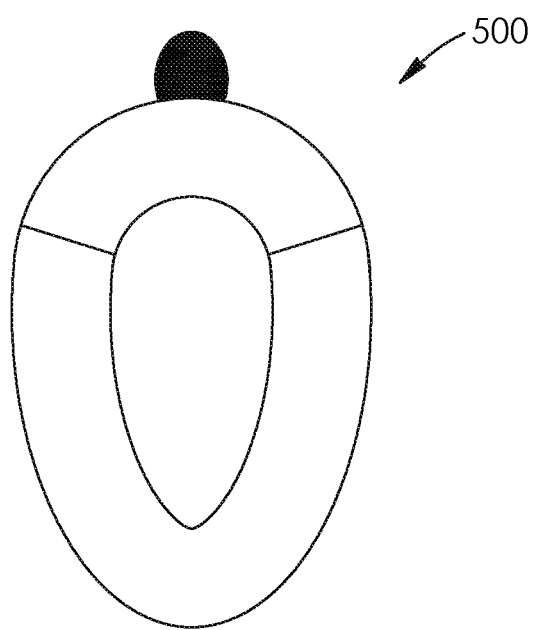
FIG. 4 shows a storage container of the present technology.

As shown in FIG. 4, the combination of the fabric and formulation can be used to form storage containers, generally referred to as 500. The storage containers 500 are for storing perishables. One shape of a storage container is shown. Many different shapes and sizes can be made. They can be die cut designs, molded designs, cast designs, woven designs, perforated side designs, sheets riveted or hinged or otherwise affixed to one another to produce a box and the like.

Figure 5:
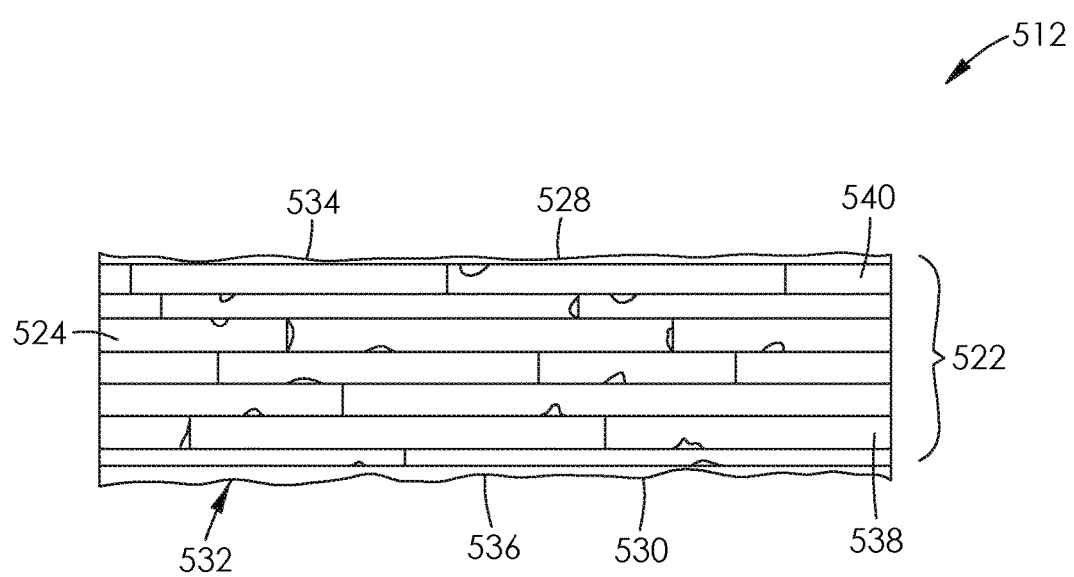
FIG. 5 shows a cross sectional view of the storage container of the present technology.

As shown in FIG. 5, the storage container 500 has an inner layer 522 that is a natural fabric 524 and the formulation, generally referred to as 532, a first layer 528, a second layer 530, a first surface 534, and a second surface 536. The natural fabric 524 provides structural support for the formulation 532. The formulation 532 may sandwich, coat, impregnate, infiltrate, partially coat, cover, partially cover, or infuse the fibres 540 of the fabric 524. It substantially fills the interstitial spaces 538. The formulation 532 in the first layer 528 and the second layer 530 is continuous with the formulation in the interstitial spaces 538. The first layer 428 and the second layer 430 form the first surface 534 and the second surface 536 and are the fabric infused with the formulation 532.

The fabric material has a thread count of about 10 nm/3 to about 10 nm/2. The preferred fabrics are made with natural fibres, such as knits and weaves of cotton, hemp, linen, sisal, silk and mixtures thereof. The preferred fabric weight is about 14 ounces to about 16.5 ounces to about 25 ounces and is canvas. The resulting cutting board is about 1 mm to about 4 mm thick.

In one embodiment, the formulation is about 30% to about 50% tree resin, and about 50% to about 70% bees wax, preferably about 30% tree resin, and about 70% bees wax. The formulation optionally includes charcoal as a colourant and odour inhibitor. It is preferred that the tree resin is Damar resin.

In another embodiment, the formulation is about 30% to about 40% tree resin, about 30% to about 40% bees wax and about 20% to about 40% kaolin. The formulation optionally includes charcoal as a colourant and odour inhibitor. It is preferred that the tree resin is Damar resin.

The preferred fabrics are made with natural fibres, such as knits and weaves of cotton, hemp, linen, sisal, silk and mixtures thereof. The preferred fabric weight is about 14 ounces to about 16.5 ounces to about 25 ounces and is canvas. The resulting cutting board is about 3 mm to about 5 mm thick.

Figure 6:
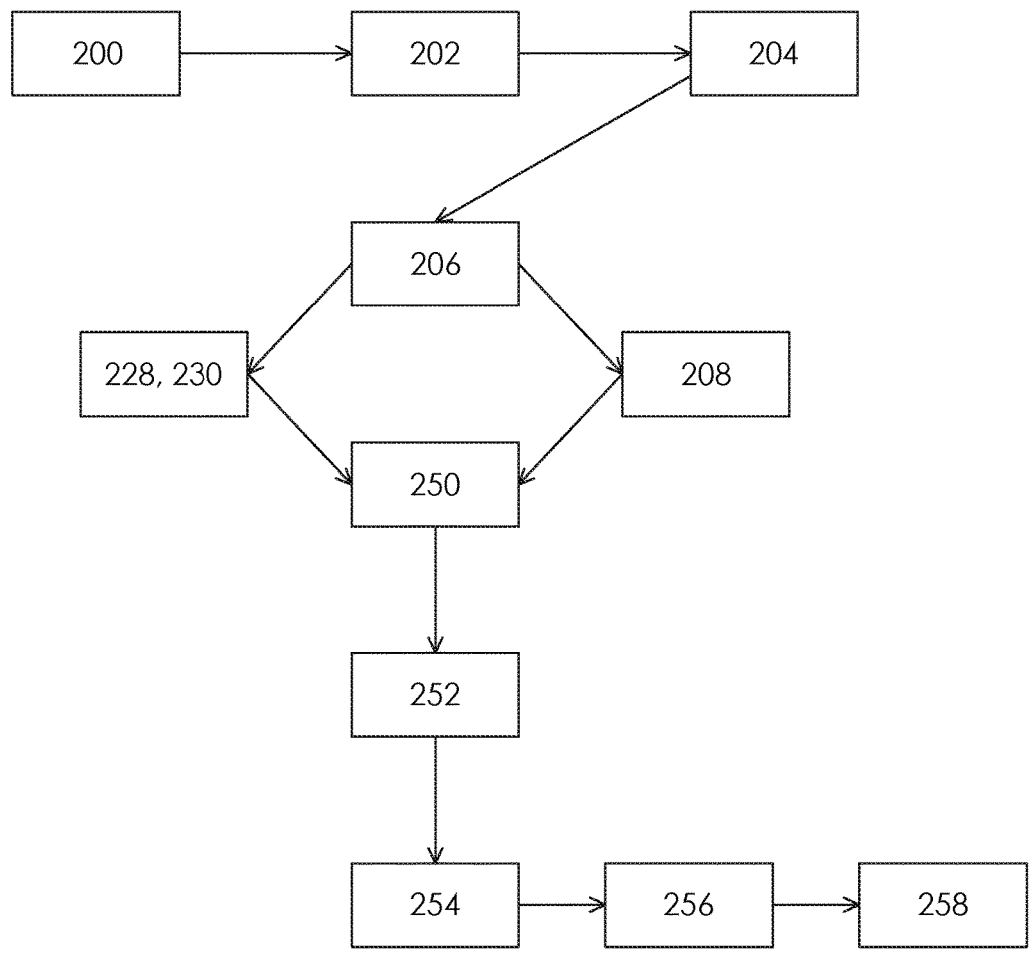
FIG. 6 shows the method of preparation of the embodiments of the present technology.

The cutting boards and storage containers are made by the method of FIG. 6.

In another alternative embodiment, the bees wax is replaced with another low melting point natural wax or mixture of natural waxes that have the same or similar chemistry and physical properties to that of bees wax. The wax is anti-microbial. The preferred melting point of the wax is about 50 C to about 100 C, preferably about 60 C to about 90 C, and most preferably about 65 C. The mixture is pliable at room temperature.

Example 1

Figure 7:
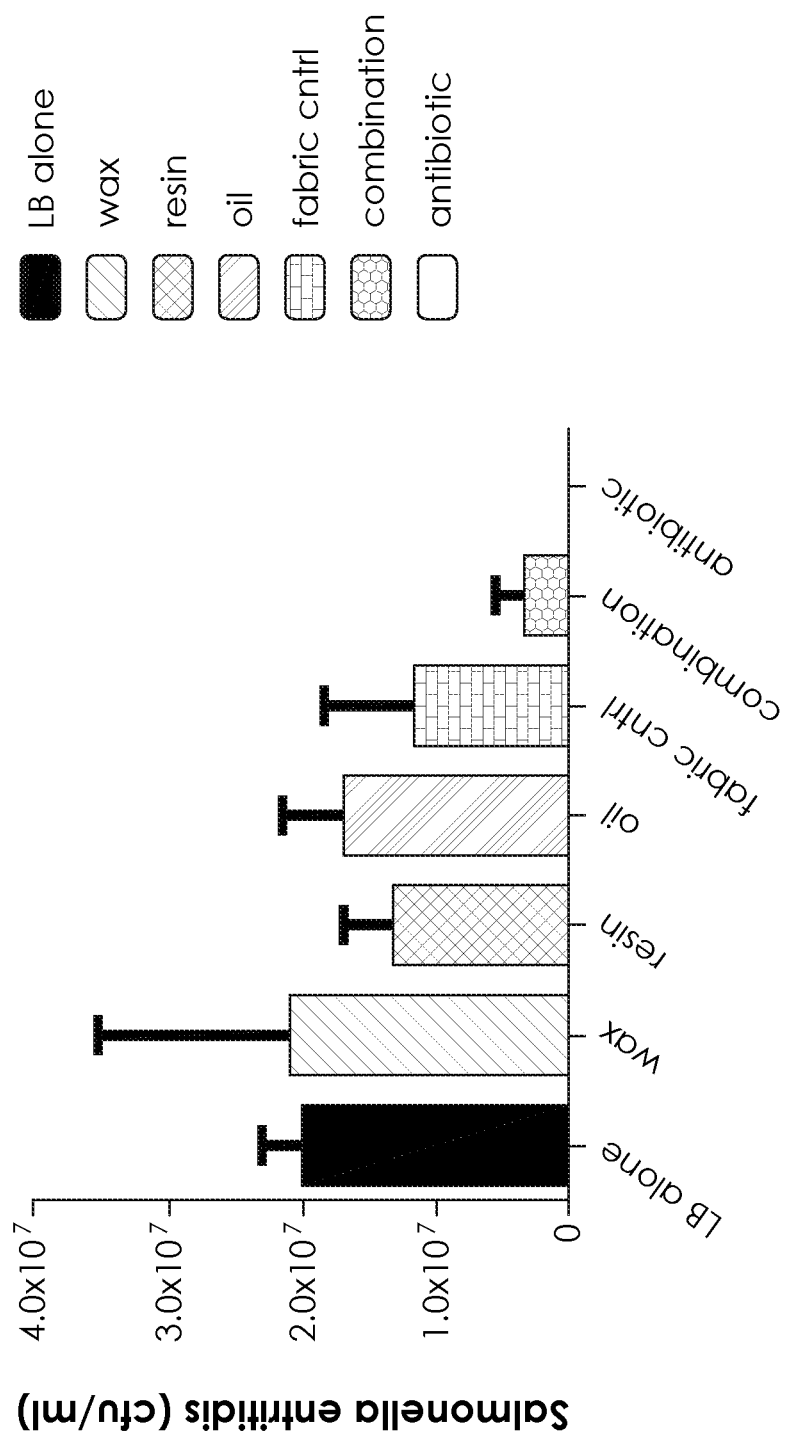
FIG. 7 shows the results of a culture inoculated (*Salmonella enteritidis* PT13A): $8*10^9$ colony forming units per milliliter [cfu/ml] (in triplicate).
Figure 8:
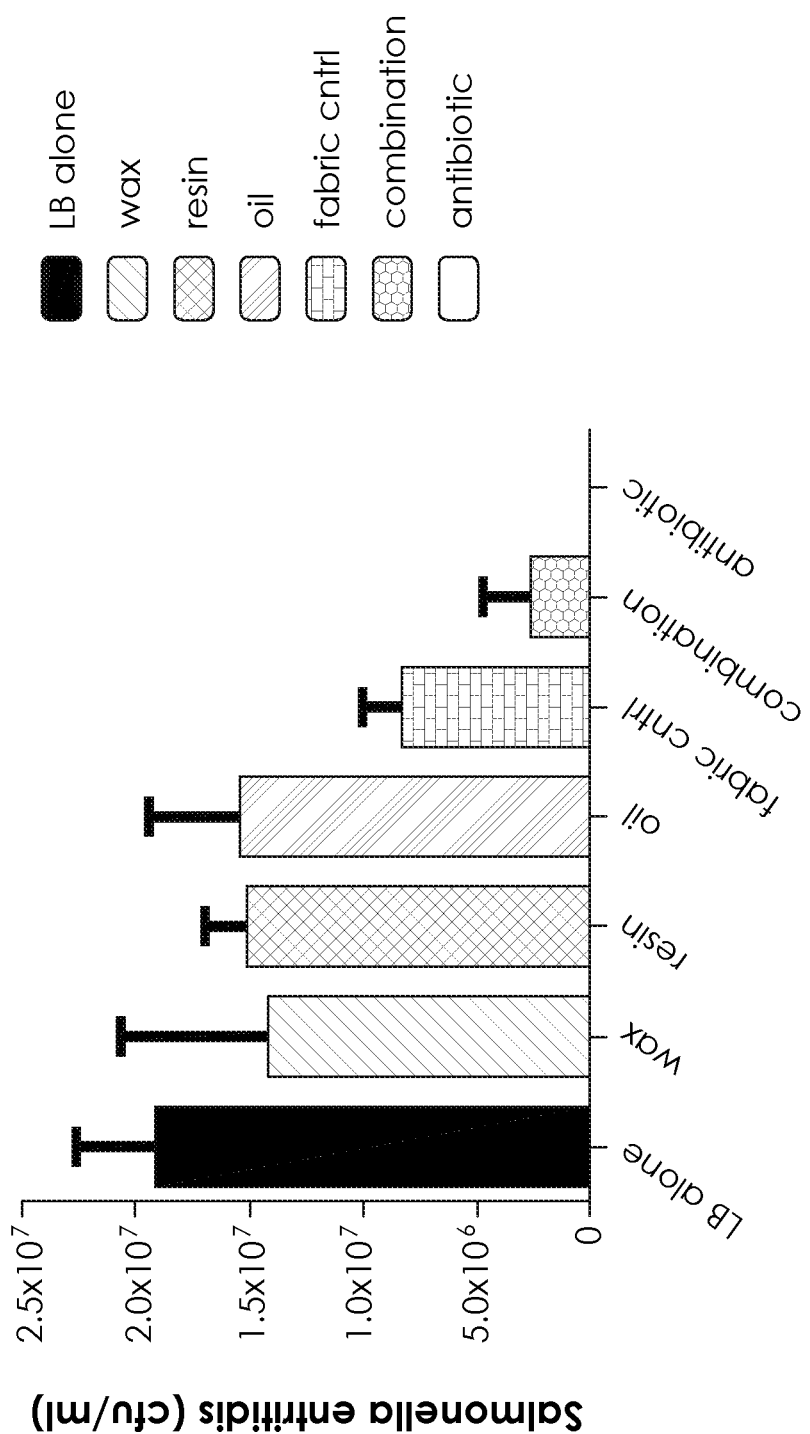
FIG. 8 shows the results of a culture inoculated (*Salmonella enteritidis* PT13A): $8*10^9$ colony forming units per milliliter [cfu/ml] (in four replicates).

The anti-microbial properties were studied by exposing the above disclosed beeswax containing products to the following bacteria. The results are shown in FIG. 7 and FIG. 8. The kaolin was not tested on its own as it made a slurry with the LB broth. It can be seen that each component of the product had a non-significant reduction in growth of the *Salmonella*, but the product had resulted in a highly significant reduction ($P<0.05$ in a two tailed T-Test) in growth of the bacteria. The strain tested is a highly virulent human strain. These results demonstrate that the product is antimicrobial. Without being bound to theory, there is a synergistic effect of the combination of the cellulosic layer and the formulation.

The invention claimed is:

1. A self-healing cutting board, the cutting board comprising a natural fabric and an anti-microbial formulation, the formulation infusing the natural fabric to provide an upper cutting surface and a lower cutting surface, the formulation comprising bees wax and Damar resin, and having a melting point of about 70 C to about 80 C.

2. The self-healing cutting board of claim 1, wherein the fabric has a plurality of interstitial spaces and the interstitial spaces are substantially filled with the formulation.

3. The self-healing cutting board of claim 2, wherein the formulation comprises about 30% to about 50% Damar resin and about 50% to about 70% bees wax.

4. The self-healing cutting board of claim 2, wherein the formulation is composed of about 30% to about 40% Damar resin, about 30% to about 40% bees wax and about 20% to about 40% kaolin.

5. The self-healing cutting board of claim 3, wherein the natural fabric is a knit or weave of a fibre selected from the group consisting of bamboo linen, silk, cotton, jute, kenaf, hemp, linen, sisal, herbaceous dicot fibres and monocot fibres and mixtures thereof.

6. The self-healing cutting board of claim 5, wherein the fabric is canvas.

7. A self-healing cutting board, the cutting board comprising a natural fabric and an anti-microbial formulation, wherein the fabric has a plurality of interstitial spaces and the interstitial spaces are substantially filled with the formulation to provide an upper cutting surface and a lower cutting surface, the formulation comprising about 50% to about 70% bees wax and 30% to about 50% Damar resin, and having a melting point of about 70 C to about 80 C.

8. The self-healing cutting board of claim 7, wherein the formulation is composed of about 30% to about 40% Damar resin, about 30% to about 40% bees wax and about 20% to about 40% kaolin.

* * * * *